J. H. BOYD.
Guano and Seed Distributors.

No. 144,250. Patented Nov. 4, 1873.

Witnesses:
E. Wolff
Alex F. Roberts

Inventor:
J. H. Boyd
Per Munn &c.
Attorneys.

UNITED STATES PATENT OFFICE.

JAMES H. BOYD, OF PLAIN, SOUTH CAROLINA.

IMPROVEMENT IN GUANO AND SEED DISTRIBUTERS.

Specification forming part of Letters Patent No. 144,250, dated November 4, 1873; application filed July 19, 1873.

*To all whom it may concern:*

Be it known that I, JAMES HARRISON BOYD, of Plain, in the county of Greenville and State of South Carolina, have invented a new and Improved Guano and Seed Distributer, of which the following is a specification:

The invention will first be fully described, and then pointed out in the claim.

Figure 1:
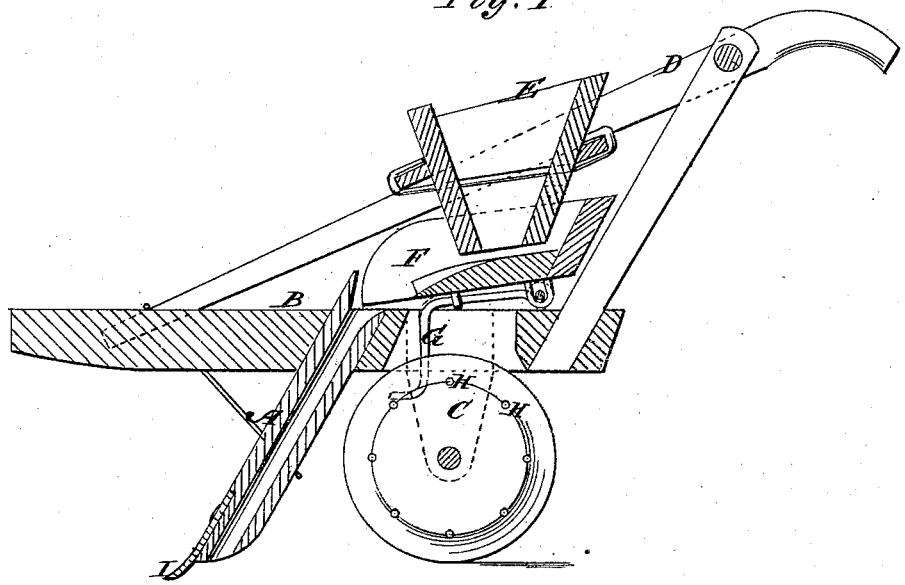
Figure 2:
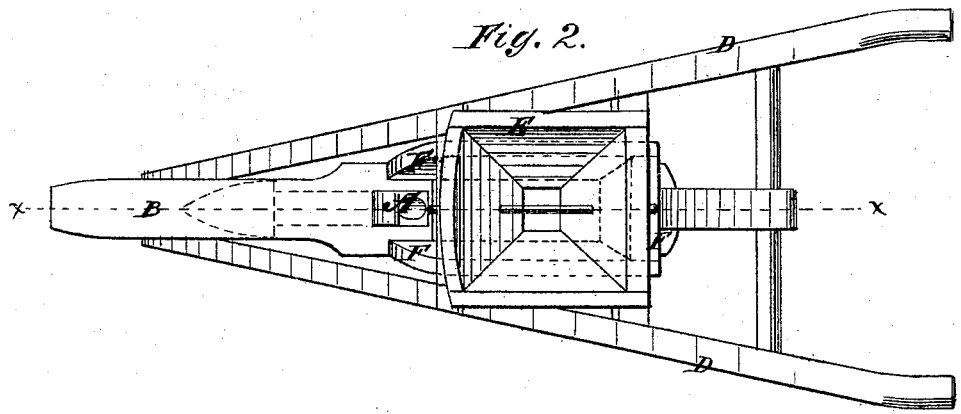

Figure 1 is a longitudinal sectional elevation of my improved machine, taken on the line $x$ $x$ of Fig. 2; and Fig. 2 is a plan view.

A is the tubular plow-stock, which extends downward from the beam B in the ordinary way. Said beam is mounted on a wheel, $c$, and is provided with the ordinary plow-handles D, and carries a hopper, E, for the seed or other matter to be distributed, said hopper being mounted in front of the handles, and sufficiently above the beam to admit the shaking and distributing shoe F under it. This shoe is arranged to discharge into the stock at the top, and is actuated by the rattle-staff G and the pins H on the side of the wheel. I is the plow upon the foot of the stock. It will be arranged in practice to nearly surround the passage of the seeds or other matters to the bottom of the furrow, so that the delivery of it upon the bottom will be insured, and thereby the thorough covering of it will also be insured, as the ridges turned up by the plow will be prevented from falling back into the furrow until the substance being dropped is deposited on the bottoms.

The furrow can be made any required depth, so that cotton-seed may be planted in the furrow above the fertilizers deposited at the bottoms.

The machine will be very serviceable for planting the cotton, and also plowing and cultivating the plants, and at the same time manuring them by dropping the fertilizer while cultivating the cotton.

Having thus described my invention, I claim as new and desire to secure by Letters Patent—

A plow-tube, A I, and shaking conveyer F, combined with seed-hopper E, as and for the purpose described.

JAMES HARRISON BOYD.

Witnesses:
GEORGE W. BLAKELY,
TOLIVER W. COX.